United States Patent
Bornemann et al.

(10) Patent No.: US 10,222,781 B2
(45) Date of Patent: Mar. 5, 2019

(54) APPARATUS FOR MONITORING AND PROVIDING VISUAL REPRESENTATIONS OF THE OPERATING CONDITIONS OF MACHINE TOOL PARAMETERS

(71) Applicant: DECKEL MAHO Pfronten GmbH, Pfronten (DE)

(72) Inventors: Armin Bornemann, Marktoberdorf (DE); Reinhold Seitz, Hopferau (DE); Hans Gronbach, Eisenberg (DE); Peter Pruschek, Pfronten (DE)

(73) Assignee: DECKEL MAHO Pfronten GmbH, Pfronten (DE)

( * ) Notice: Subject to any disclaimer, the term of this patent is extended or adjusted under 35 U.S.C. 154(b) by 272 days.

(21) Appl. No.: 14/997,973

(22) Filed: Jan. 18, 2016

(65) Prior Publication Data

US 2016/0147216 A1 May 26, 2016

Related U.S. Application Data

(63) Continuation-in-part of application No. 13/328,575, filed on Dec. 16, 2011, now abandoned.

(30) Foreign Application Priority Data

Dec. 17, 2010 (DE) .......................... 10 2010 054 855

(51) Int. Cl.
*G05B 19/4065* (2006.01)
*B23Q 17/00* (2006.01)
(Continued)

(52) U.S. Cl.
CPC ....... *G05B 19/4065* (2013.01); *B23Q 1/0045* (2013.01); *B23Q 17/007* (2013.01); *B23Q 17/0952* (2013.01); *G05B 2219/50206* (2013.01)

(58) Field of Classification Search
CPC ...... G05B 19/4065; G05B 2219/50206; B23Q 1/0045
See application file for complete search history.

(56) References Cited

U.S. PATENT DOCUMENTS 4,442,493 A 4/1984 Wakai et al.
5,777,904 A * 7/1998 Schneider ............... A63F 13/02
324/677

(Continued)

*Primary Examiner* — Phuc Dang
(74) *Attorney, Agent, or Firm* — The Maxham Firm

(57) ABSTRACT

Apparatus for monitoring and providing visual representations of the operating conditions of machine tool parameters, in particular for program-controlled turning, milling, and drilling machines, which have a machining unit displaceable in a plurality of coordinate axes, in which a work spindle for exchangeable receiving a machining tool and an electric motor for driving the work spindle are mounted. The machine tool includes a control unit and means for monitoring the operating state of the machine tool. The monitoring apparatus has at least one sensor for detecting at least one operating parameter of the machine tool. An evaluating unit is connected to both the sensor and the control unit and processes the measurement values detected by the sensor. An optical display is provided in the direct viewing range of the operator, which viewing range includes the machine operating spindle, tool holder, tool, and workplace. The optical display can display a normal, a critical, and a dangerous operating state of the machine tool in accordance with the data from the evaluating unit.

3 Claims, 1 Drawing Sheet

(51) Int. Cl.
*B23Q 17/09* (2006.01)
*B23Q 1/00* (2006.01)

(56) References Cited

U.S. PATENT DOCUMENTS

| | | | |
|---|---|---|---|
| 6,338,003 B1 | 1/2002 | Kamiguchi et al. | |
| 6,376,828 B1 * | 4/2002 | Comiskey | G02B 6/0028 |
| | | | 250/216 |
| 6,438,445 B1 | 8/2002 | Yoshida et al. | |
| 6,594,930 B1 * | 7/2003 | Segan | G09F 11/025 |
| | | | 40/503 |
| 6,925,915 B1 * | 8/2005 | Claesson | B23B 25/02 |
| | | | 82/133 |
| 8,068,104 B2 | 11/2011 | Rampersad | |
| 8,090,463 B2 * | 1/2012 | Kaever | G05B 23/0264 |
| | | | 700/108 |
| 8,477,022 B2 | 7/2013 | Taguchi et al. | |
| 8,723,869 B2 | 5/2014 | Kaushal et al. | |
| 2004/0148136 A1 | 7/2004 | Sasaki et al. | |
| 2007/0159850 A1 * | 7/2007 | Yang | G02F 1/133615 |
| | | | 362/613 |
| 2009/0051521 A1 | 2/2009 | Crowe et al. | |
| 2009/0115874 A1 * | 5/2009 | Kim | H04N 9/045 |
| | | | 348/273 |
| 2009/0135313 A1 * | 5/2009 | Endo | G03B 21/005 |
| | | | 348/757 |
| 2009/0192728 A1 | 7/2009 | Wright et al. | |
| 2009/0240469 A1 * | 9/2009 | Piggott | G05B 23/0237 |
| | | | 702/182 |
| 2010/0152882 A1 | 6/2010 | Krapf et al. | |
| 2010/0277107 A1 | 11/2010 | Baaijens et al. | |
| 2011/0037725 A1 | 2/2011 | Pryor | |
| 2011/0102758 A1 * | 5/2011 | Schwab | G03F 7/70075 |
| | | | 355/67 |
| 2012/0266665 A1 * | 10/2012 | Stellmann | B23D 59/001 |
| | | | 73/73 |

\* cited by examiner

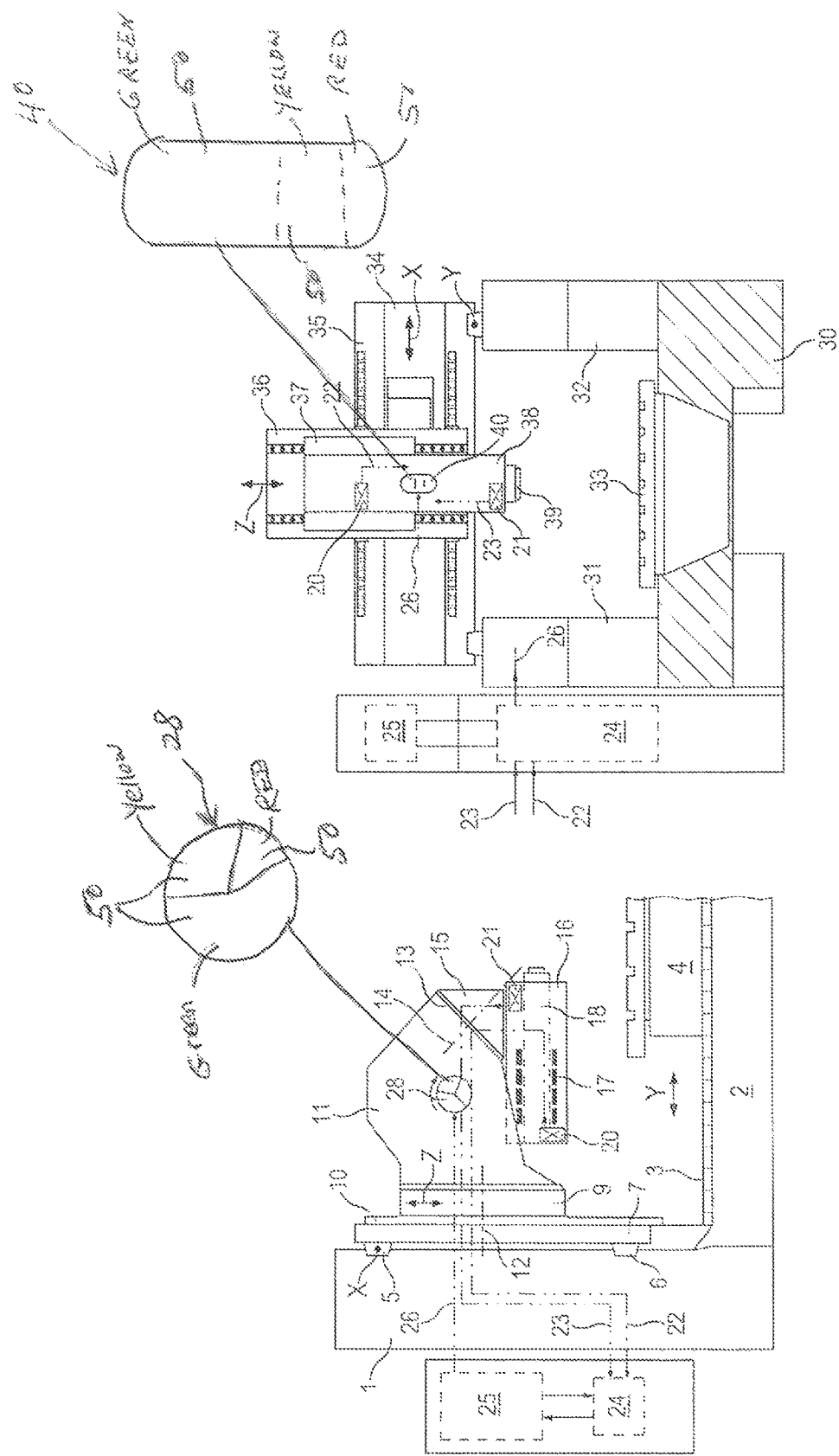

APPARATUS FOR MONITORING AND PROVIDING VISUAL REPRESENTATIONS OF THE OPERATING CONDITIONS OF MACHINE TOOL PARAMETERS

CROSS REFERENCE TO RELATED APPLICATION

The present application is a continuation-in-part of prior application Ser. No. 13/328,575, filed 16 Dec. 2011, ABN, which is incorporated herein by reference in its entirety.

FIELD OF THE INVENTION

The invention relates to an apparatus for monitoring operating states of a machine tool such as a program-controlled milling and drilling machine. Machine tools of this type typically comprise a workplace table or platform and a machining unit displaceable by a motor in a plurality of coordinate axes in which a work spindle for exchangeably receiving a machining unit and an electric motor as a rotating drive of the work spindle are mounted, and including a control unit.

DISCUSSION OF THE PRIOR ART

A continuous monitoring of the operating states during the working mode of a machine is essential for recognizing possible disruptive factors at an early stage of their development and for being able to initiate counter-measures in time. In modern program-controlled machine tools and machining centers, the set-up of the machine before the machining of a particular workplace or a series of workpieces is of considerable importance for achieving smooth work processes under optimized conditions. So far, the set-up of the machine before the start of the work and the monitoring of its state during operation has exclusively been performed via the control panel, of the control unit which usually is on a limitedly moveable stand next to or diagonally in front of the machine and not on or near the same line of sight with the operating tool and workpiece. Thus, when approaching die machining, the operator needs to monitor the indications of the relevant operating parameters on the control panel and, if possible, at the same time keep an eye on the actual working manner of the tool—in a simulated or also in an actual operation. The operator has to fulfill similar requirements during the monitoring of the state which possibly extends across long operating times because the continuous observation of the indications on the control panel and the engagement of the work tool on the respective workpiece in the workspace of the machine require significant efforts.

To recognize sources of error as early as possible before they actually occur plays an important role for the continuous operating procedure because the occurrence of these errors and thus their serious effects on the machining of workpieces can be prevented by interventions of the operator, such as initiating a tool change. The continuous and exact monitoring of the state of a plurality of complex machines requires experienced operators and a high measure of continuous attention to the known systems now used.

SUMMARY OF EMBODIMENTS OF THE INVENTION

It is a purpose of embodiments of the invention to provide apparatus for monitoring the operating states or conditions of a machine tool to take pressure off the operator and increases the reliable capacity of the machine tool to work properly.

By providing at least one sensor system on a selected component of the machine tool it is possible to continuously monitor a particular operating parameter on the machine part which is particularly relevant for this operating parameter. As the operating parameter, the power consumption of the electric motor of the work spindle, the vibration at the output end of the work spindle, the temperature in thermally stressed machine parts, and also the state of the lubricant, may be used, for example. As an evaluating unit is connected to the sensor system on the one hand and to the control machine's unit on the other hand, data from the control unit and data from the sensor system may be linked with each other and processed in order to receive data with respect to the operating state of the machine. An intensive and fatigue-reducing display is achieved by the fact that an optical display element is disposed in the operator's direct viewing range on a machine part, the display having a device for indicating a normal, a critical, and a dangerous operating state of the machine based on the data output by the evaluating unit.

The monitoring means of the machine tool, among others, offers the advantage that an operator may recognize normal and also critical operating states of the machine tool at an early time and in a simple manner by observation, which is primary for the operator, of the optical display arranged preferably within the working range of the machine. To emphasize the value of the location of the optical display element, the work spindle, tool holder, and work tool, as well as the workpiece upon which the tool is operating, are within the same viewing area as the optical display element. Thus, a change of the operator's observation angle or position between the display on the control panel and the working range of the work tool is no longer necessary. The display of the respective operating states in different colors promotes the long-term attention of the operator, in particular in case of a sudden change of color. Thus, the possibility exists that disturbances and errors may be recognized by a change of color in the display at an early time and before they negatively affect the machining process so that countermeasures may be initiated by the operator or also by a control unit before any malfunctions can have a practical impact. The detection and display in the run-up to the occurrence of errors lead to improved operating procedures and reduced stoppage times of the machine. These effects not only have an impact on the monitoring of the state of an individual machine but their advantageous effect also shows when a single operation has to operate and monitor a group of machines.

Although an optical display in, preferably, three traffic light colors, sufficiently fulfills the monitoring function, it may still be suitable to combine the optical display with an acoustic response to thus increase the attention factor.

According to a suitable design of the present monitoring apparatus, the display contains a plurality of color ranges which are alternately activated, that is, green for normal operation, yellow/orange for less than optimal or critical operation, and red for dangerous operation. Here, in a special display element the green field for the normal operation would typically be substantially larger than the yellow/orange field for the critical operation, and this in turn would normally be larger than the red field for the dangerous operating state. A proportional distribution of the available field sizes of green of about 60%, yellow/orange of at least 20%, and red of less than 20%, has proven particularly suitable. The large green field represents a normal operating state wherein the relative size of the illuminated portion of the green field indicates the actual size or strength of the monitored operating parameter. Therefore, when the machine is set up the operator may adjust the machine to a value close to the upper limit of the intensity or size of the green field, that is, at about 60%. Thus, the operator may, for example, select the forward feed of the tool to be so large that the power consumption of the electric motor of the work spindle is in the upper range of the green field. The forward feed optimized in such a manner leads to a corresponding machining performance. A similar approach may be performed, for example, by monitoring vibrations at the tool holder.

The yellow/orange field in the optical display element points out to the operator that, for example, the power consumption of the spindle motor or the vibrations of the work spindle or the tool are less than optimal and within a limit range, and measures should be initiated shortly to return these operating parameters to their normal strengths or magnitudes. This may be made, for example, by reducing the forward feed, changing the tool, or other measures. What is important is that the efforts and carefulness for monitoring a machine are reduced for an operator when very diverse set-up works are performed and a plurality of machines is monitored, which has a positive effect on the permanent operation of ail machines.

The optical display is suitably attached to the outside of a side wall of the machining unit as an optical illuminating element so that it will be in the operator's immediate viewing range, as defined above, if he or she is watching the operation of a tool on a workpiece in the working range of the machine.

Preferably, each field of the display contains a plurality of luminaires, such as LEDs, which are disposed in a housing capsule with a transparent outer wall and electrically connected to the evaluating unit and the control unit, respectively. In this case it is an advantage if the number of the respective luminaires is proportional to the measured magnitude or strength of the respective parameter so that the operator is shown the magnitude and perceived value of the respective relevant operating parameter by the number of the respectively activated luminaires and thus by the magnitude of the respective illuminating field.

BRIEF DESCRIPTION OF THE DRAWING

In the following, embodiments of the invention will be described in detail by referring to the drawing, wherein:

FIG. 1 is a side view of a universal milling machine comprising a swivel head in schematic lateral view, with a display apparatus in accordance with the invention; and FIG. 2 is a front view of an alternative embodiment of a vertical milling machine comprising a vertically oriented spindle head, with a display apparatus in accordance with the invention.

DETAILED DESCRIPTION OF EMBODIMENTS OF THE INVENTION

The universal milling machine shown in FIG. 1 comprises rear stand 1 and machine bed 2 arranged at the lower face thereof, on which workpiece table 4 can be driven on guiding rails 3 by a motor (not shown) in the direction of the Y coordinate axis. Horizontal slide 7 is mounted in horizontal guiding rails 5, 6 at the front of stand 1 so that it can be displaced by a motor (not shown) in the direction of the X coordinate axis. On the front of slide 7 is cross-slide 9 guided in vertical guiding rails 10 so as to be moveable by a motor (not shown) in the direction of the Z coordinate axis. Head 11 is mounted on the front of cross-slide 9 so that the head is rotatable about horizontal axis 12. Swivel head 15 is supported on front surface 13 of head 11, inclined by 45°. Swivel head 15 can be moved by a motor (not shown) about axis 14 which is inclined by 45°. Spindle housing 16 is fixed to one surface of swivel head 15. Spindle motor 17 (toward the left of housing 16 as shown) and work spindle 18 in front of the motor are arranged in housing 16, each of them shown by dashed lines. At the rear end of housing 16 in the rear area of spindle motor 17, is sensor 20, which continuously detects the power consumption of the motor. The motors mentioned herein are conventional for such machine tools and need not be detailed here. The combination of head 11, swivel head 15, housing 16, spindle 18, and motor 17 may be referred to as a machining unit.

At the front end area of spindle housing 16 is vibration sensor 21, which detects vibrations which may occur at the tool holder or the clamped tool during operation. Sensors 20 and 21 form at least part of a sensor system, which are connected via data lines 22, 23 to evaluating unit 24 which, in turn, is connected to conventional programmable control unit 25.

Data line 26 leads from control unit 25 to display element 28. The display element is arranged as a rotationally fixed circular, for example, illuminating element in a side wall of head 11 at an economically favorable position so that it is in the direct viewing range, which includes the machining unit spindle, tool holder and tool, of an operator standing next to the machine. This display element contains a transparent housing capsule in which a plurality of luminaires in each color field, such as LEDs, is arranged. Furthermore, display element 28 is divided into three color fields, namely a large green-colored field occupying about 60% of the illumination surface, a middle-sized yellow/orange field occupying at least about 20% of the illumination field, and a small red field occupying less than about 20% of the illumination field. Depending on tire measurement values obtained by sensor system 20, 21 and the operating state determined in evaluating unit 24, more or fewer lines of LEDs become visible as a green, yellow/orange, or red field. The green field designates the normal operating state, the yellow/orange field indicates the beginning of a critical operating state, and the red field indicates a dangerous operating state of the machine tool, each according to the magnitude of the detected power consumption and/or vibration, parameters. Thus, when the tool and tool holder are operating vibration free, for example, ail the luminaires in the green field are energized and the green field is full. As the spindle starts to experience minor vibrations, some of the luminaires in the green field are de-energized, making the green field become somewhat dim, or visually smaller. That is what is meant by "strength," "magnitude," or "size," as used above in relation to the status of the sensed operating parameters.

In order to monitor other states and properties of the machine tool, further operating parameters, such as, for example, the temperatures of particularly stressed components or the like, may be detected by corresponding sensors and included in the monitoring via the evaluating unit.

The milling and drilling machine schematically shown in a front view in FIG. 2 has base 30 comprising side walls 31, 32 mounted thereon and workpiece table 33 arranged between the side walls. Transverse traverse 35 is mounted in two guiding rails mounted on the top surface of side walls 31, 32 so as to be displaceable by a motor (not shown) in the direction of the Y coordinate axis. Cross-slide 36 is disposed on the front face of traverse 35 and vertical slide 37 is disposed on the front of cross-slide 36, both slides being disposed on guiding rails so that they can be displaced by a motor or respective motors (not shown). Here, electric linear motors, for example, can serve for driving the slides. Cross-slide 36 is movable in the direction of the X coordinate axis and vertical slide 37 displaceable in the direction of the Z coordinate axis. This arrangement provides the support for vertical milling head 38 in whose housing a work spindle and the drive motor thereof (not shown) are supported.

In order to detect the vibrations occurring at tool holder 39 on the end of the work spindle or the tool clamped therein in machining operations, this embodiment also provides sensor 21 in the front portion of spindle housing 38, which is connected to evaluating unit 24 via data line 23. In the same manner as in the embodiment of FIG. 1, another sensor 20 is disposed in the end portion of the spindle drive motor in spindle housing 38, which sensor detects the power consumption of the electric drive motor and is connected to evaluating unit 24 via data line 22. Data line 26 leads from evaluating unit 24 to display element 40, which corresponds to display element 40 in FIG. 1 as to its function. However, as shown in FIG. 2, display element 28 has an oval or elongated shape. This display element also contains a plurality of colored fields or areas 50 which, depending on the magnitude of the continuously detected operating parameter, light up in a specific color and with a specific size or intensity and thus indicate the respective operating state of the parameters of the machine tool to the operator. In this course, the display of only one parameter, for example, of the measured vibrations or the power consumption of the spindle motor, may be made depending on the set-up by the operator via keys or switches (not shown) that can either be provided in the control panel (not shown) of the control unit or in or on the evaluating unit. This element of control is also available in the FIG. 1 embodiment.

The display, according to the invention embodiments shown, suitably contains a scaling, for example, in the shape of a division scale for a percentage field size division. A scaling based on a changing number of activated illumination elements, that is, LEDs, adapted to the magnitude and/or perceived value of the measured operating parameter is preferred.

A method for setting up the machine tool for machining a particular workpiece is characterized in that the operator visually monitors the interface of tool/workpiece in the working range of the machine, in the simulated or actual operation, while the set-up works are performed. In order to optimize the work procedures and results, the operator may set operating parameters on the keyboard of the control unit, for example, the spindle forward feed, spindle speed, or the like, so that the continuously monitored display is in the upper or more intense color range of the green field.

The invention is not limited to the embodiments as shown and described above. For example, sensors may be provided for detecting a multitude of different operating parameters and connected to the evaluating unit or also directly to the control unit. Depending on the priority of the respective operating parameter, the measurement values of the individual sensors may be displayed separately via the evaluating unit in the display element. There is also the possibility that the evaluating unit links the measurement values of the various operating parameters with each other and supplies data from a combination of these measurement values to the display unit. Thus, for example, the support temperatures of the work spindle, the power consumption of the spindle motor, and the vibrations of the tool holder may be measured individually and displayed individually as parameters, optionally in a changing sequence. Three or more parameters may also be processed in the evaluating unit into a common data set which is displayed and indicates the operating state of the machine in a combined assessment of the parameters.

What is claimed is:

1. A machine tool for machining a workpiece, said machine tool comprising:
    a control unit,
    a machining unit displaceable in a plurality of coordinate axes, wherein the machining unit includes a work spindle and tool holder for exchangeably receiving tools and a motor for driving the work spindle,
    two or more sensors for monitoring the operating condition of at least one operating parameter of said machining unit, said two or more sensors including:
        a vibration sensor which detects vibrations occurring on the tool, and
        a sensor continuously detecting the current draw of the motor for driving the work spindle;
    an evaluating unit connected to said two or more sensors and to said control unit for processing measurement values detected by said two or more sensors and said evaluating unit configured for outputting output data indicative of the magnitude of the perceived value of the operating condition of said at least one operating parameter; and
    an optical display device configured to display magnitude levels of a normal, a critical, and a dangerous operating condition of said machining unit pursuant to the output data from said evaluating unit;
    said optical display device comprising a unitary optical display element having a single optically illuminatable surface divided into at least three dells disposed in an economically favorable position on an outside wall of said machining tool,
    said optical display device and the machine work spindle and work tools are in direct viewing range of an operator of the machine tool,
    said at least three fields of said unitary optical display element of said optical display device being arranged in a transparent housing capsule and having at least three distinctly colored areas, including a green area occupying at least about 60% of the optically illuminatable surface, a yellow/orange area occupying at least about 20% of the optically illuminatable surface, and a red area occupying less than about 20% of the optically illuminatable area,
    the size of each said at least three colored areas being constant, and each of said at least three distinctly colored areas comprising a plurality of LEDs, and
    said plurality of LEDs being operatively connected to and being responsive to the data output from said evaluating unit to illuminate the LEDs in one said colored area to indicate the magnitude of the operating condition of the operating parameter being measured, wherein the plurality of LEDs being configured to be activated based on the magnitude indicated by the data output such that the number of activated LEDs among the LEDs is proportional to the magnitude of the operating condition of the operating parameter being measured.

2. The machine tool according to claim 1, wherein said evaluating unit is functionally linked to the control unit and determines the respective state variable of the monitored operating parameter from the measured values of said two or more sensors and from data of the control unit and activates the color in the optical display corresponding to the state variable being monitored.

3. The machine tool according to claim 1, wherein said optical display is formed as a rotationally fixed, circular light element.

* * * * *